(12) United States Patent
Fieau et al.

(10) Patent No.: US 10,063,614 B2
(45) Date of Patent: Aug. 28, 2018

(54) METHOD FOR OBTAINING A STORAGE IDENTIFIER IN A HIERARCHICAL LEVEL OF STORAGE IN A NETWORK FOR STORING DATA

(75) Inventors: Frédéric Fieau, Perros Guirec (FR);
Nathalie Omnes, Trebeurden (FR);
Gaël Fromentoux, Ile Grande (FR)

(73) Assignee: ORANGE, Paris (FR)

( * ) Notice: Subject to any disclaimer, the term of this patent is extended or adjusted under 35 U.S.C. 154(b) by 315 days.

(21) Appl. No.: 13/997,064

(22) PCT Filed: Dec. 19, 2011

(86) PCT No.: PCT/FR2011/053061
§ 371 (c)(1),
(2), (4) Date: Jun. 21, 2013

(87) PCT Pub. No.: WO2012/085432
PCT Pub. Date: Jun. 28, 2012

(65) Prior Publication Data
US 2013/0268629 A1    Oct. 10, 2013

(30) Foreign Application Priority Data

Dec. 23, 2010 (FR) ..................... 10 61154

(51) Int. Cl.
*H04L 29/08* (2006.01)

(52) U.S. Cl.
CPC .......... *H04L 67/02* (2013.01); *H04L 67/1002* (2013.01); *H04L 67/1025* (2013.01);
(Continued)

(58) Field of Classification Search
CPC ................ G06F 12/06; G06F 12/0864; G06F 17/30206; G06F 17/30241; G06F 17/302; G06F 3/0605; G06F 3/0607; G06F 3/0608; G06F 3/061; H04L 29/06027; H04L 67/02; H04L 67/2885; H04L 67/1097;
(Continued)

(56) References Cited

U.S. PATENT DOCUMENTS 6,233,241 B1 * 5/2001 Trossen et al. ............... 370/408
6,772,209 B1 * 8/2004 Chernock ......... H04L 29/06027
709/225

(Continued)

FOREIGN PATENT DOCUMENTS

WO    WO 2009/056743 A2    5/2009

OTHER PUBLICATIONS

International Search Report dated Mar. 7, 2012 for PCT/FR2011/053061 filed Dec. 19, 2011.

*Primary Examiner* — Le H Luu
(74) *Attorney, Agent, or Firm* — Knobbe, Martens, Olson & Bear, LLP

(57) ABSTRACT

The method performed by a receiver entity in a hierarchical network, the entity having knowledge of the hierarchical levels of nodes of the network is disclosed. In one aspect, the method comprises, on reception of a request to store data as sent by a sender unit:
 a step of selecting at least one storage entity for storing the data, the selection step taking account at least of the hierarchical level of the storage entity in the network; and
 a step of sending information to the sender unit enabling it to obtain the identifier of the data storage entity.

18 Claims, 7 Drawing Sheets

(52) U.S. Cl.
CPC ........ *H04L 67/1097* (2013.01); *H04L 67/289* (2013.01); *H04L 67/2885* (2013.01); *H04L 67/1021* (2013.01); *H04L 67/1029* (2013.01)

(58) Field of Classification Search
CPC ............. H04L 67/1002; H04L 67/1021; H04L 67/1029; H04L 67/289; H04L 67/1025
See application file for complete search history.

(56) References Cited

U.S. PATENT DOCUMENTS

| | | | | |
|---|---|---|---|---|
| 7,124,249 | B1 * | 10/2006 | Darcy | G06F 12/0864 711/122 |
| 8,117,619 | B2 * | 2/2012 | LaFrese et al. | 718/104 |
| 8,495,111 | B1 * | 7/2013 | Wang et al. | 707/829 |
| 2002/0078174 | A1 * | 6/2002 | Sim | G06F 17/30194 709/219 |
| 2002/0143888 | A1 | 10/2002 | Lisiecki et al. | |
| 2003/0200400 | A1 * | 10/2003 | Nangle | G06F 12/06 711/154 |
| 2004/0133650 | A1 | 7/2004 | Miloushev | |
| 2007/0088703 | A1 * | 4/2007 | Kasiolas | G06F 3/0605 |
| 2007/0162429 | A1 * | 7/2007 | Harel et al. | 707/3 |
| 2007/0283090 | A1 * | 12/2007 | Kaji et al. | 711/114 |
| 2008/0147821 | A1 * | 6/2008 | Dietrich | G06F 17/30206 709/216 |
| 2009/0089343 | A1 * | 4/2009 | Moore | G06F 3/0608 |
| 2009/0144416 | A1 * | 6/2009 | Chatley et al. | 709/224 |
| 2009/0248712 | A1 * | 10/2009 | Yuan | 707/100 |
| 2010/0228798 | A1 * | 9/2010 | Kodama | G06F 17/30241 707/822 |
| 2011/0072206 | A1 * | 3/2011 | Ross | G06F 17/302 711/108 |
| 2011/0271037 | A1 * | 11/2011 | Oh | G06F 3/0607 711/103 |
| 2011/0271071 | A1 * | 11/2011 | Nakatogawa | G06F 3/061 711/165 |

\* cited by examiner

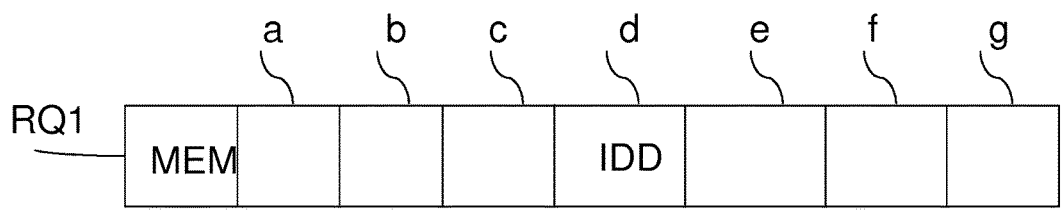
Fig.2
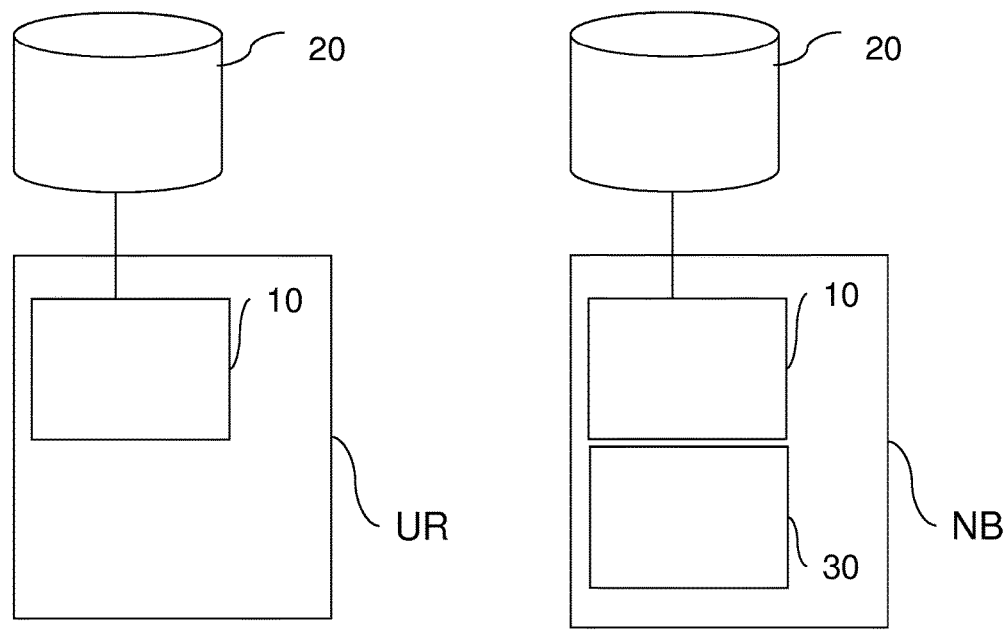
Fig.3
Fig.3 A

METHOD FOR OBTAINING A STORAGE IDENTIFIER IN A HIERARCHICAL LEVEL OF STORAGE IN A NETWORK FOR STORING DATA

RELATED APPLICATIONS

This application is the U.S. National Phase of Application No. PCT/FR2011/053061 entitled "METHOD AND DEVICE FOR DIGITAL DATA COMMUNICATION" filed Dec. 19, 2011, which designated the United States, and which claims the benefit of French Application No. 1061154 filed Dec. 23, 2010.

FIELD OF THE INVENTION

The invention lies in the context of telecommunications networks, and relates more particularly to a communication method used for storing, deploying, and distributing digital data it the network.

BACKGROUND OF THE INVENTION

It is known that the number and the volume of contents distributed in the telecommunications network is increasing very greatly and is even likely to double by 2012.

Furthermore, new terminals (mobile telephones, notebook computers, personal digital assistants (PDAs), intelligent telephones, . . . ) now enable users to produce content in a manner that is much more flexible.

In particular, such pieces of equipment often include digital cameras incorporated therein.

Telecommunications networks of the Internet protocol (IP) type make it possible to store such digital data in different pieces of equipment and to manage the geographical zone over which the content is to be distributed.

Furthermore, some of the contents may be for a small audience, while other contents may be accessed by an audience that is much greater or even global. In order to satisfy this demand, the operators of telecommunications networks have deployed hierarchical architectures (of the content delivery network (CDN) type) in which content is initially stored at a central level in order to manage content distribution and in order to cope with the increase in traffic.

Unfortunately, that architecture requires major resources to be provided for storing data in network equipment.

Networks are also known that comply with the peer-to-peer architecture, in which digital content is stored and exchanged at the level of user terminals.

That solution is not satisfactory either, since it leads to an increase in traffic in order to access the data and to instability in the configuration as a result of connections and disconnections between users. Furthermore, any single terminal cannot serve a large number of requests to access content since the data rate of the terminal is small.

The invention relates to a mechanism of distributing content (initial storage, deployment, and delivery), which method does not suffer from the drawbacks of the prior art.

OBJECT AND SUMMARY OF THE INVENTION

More precisely, the invention provides a method of communicating digital data that is performed by a receiver unit in a hierarchical network, the entity having knowledge of the hierarchical levels of the nodes of the network, the method comprising, on reception of a request to store data as sent by a first sender unit:

a step of selecting at least one first storage entity for storing the data, the selection step taking account at least of the hierarchical level of the storage entity in the network; and a step of sending information to the first sender unit enabling it to obtain the identifier of the selected data storage entity.

Correspondingly, the invention provides a digital data communication device suitable for being incorporated in a receiver unit in a hierarchical network, said receiver entity having knowledge of the hierarchical levels of nodes. The device comprises:

receiver means for receiving a request to store data, the request being sent by a first sender unit;

selector means for selecting a first storage data entity, the means taking account at least of the hierarchical level of the data storage entity in the network; and sender means for sending information to the first sender unit, the information enabling it to obtain the identifier of the first data storage entity.

Thus, and in general manner, it is important to understand that the invention makes it possible to select a data storage unit as a function of the hierarchical level of the storage unit in the network.

It is thus possible to choose to store the data at an intermediate level and not only, as in the present state of the art, either at a central level or else at the level of terminals. Those solutions have the drawback either of requiring large amounts of memory (for the central configuration), or large amounts of traffic associated with a limit on the number of accesses to the data and instability of the configuration (storage at the level of terminals).

In a particular implementation of the invention, the step of selecting the first storage unit also takes account of a location of the first sender unit. By way of example, the location may be a geographical location or a network location, e.g. a range of addresses to which the sender unit belongs.

This characteristic makes it possible advantageously to minimize the cost of transporting data when it is first stored, by selecting the storage unit that is closest to the sender unit. It should be observed that the selected storage unit may be the sender unit itself, with the storage request specifying the content to be shared on the sender unit.

The hierarchical level may also be selected as a function of the estimated audience for the data: a small geographical zone or on the contrary independently of any geographical consideration (a community that is geographically dispersed). In a particular implementation of the invention, the selection of the first storage entity takes account not only of hierarchical level, but also of at least one element selected from the cost of transferring data over links of the network, the cost of storing the data per storage entity, and a location of terminals to which the data is to be sent. The above-mentioned location may be a geographical location or it may be a network location.

This characteristic makes it possible, advantageously, to share the digital data among different storage entities in order to optimize the cost, as seen from the point of view of the operator, of transferring, storing, and delivering the content.

In another implementation, selection of the hierarchical level also takes account of the popularity of the content, the characteristics of the content, and/or the author of the content.

In a particular implementation of the invention, the communication method also takes account of a step of storing the identifier of the storage unit in a list associated with a single identifier for the data, the identifier possibly being obtained from fields of the storage request.

It should firstly be observed that the invention makes it possible to identify the digital data independently of the format of the storage request, with the information contained in the request being sufficient on its own.

It is thus possible to identify the same data in different manner on the basis of storage requests of different types.

For example, the request may contain the identifier of the data. In a variant, in order to reconstitute the identifier, it is possible to combine information contained in other fields of the request, since the request need not necessarily always include the data identifier in explicit manner.

By way of example, in order to obtain such an identifier, it is possible to use the document "Universal digital code for unique content identification", as published under the number US 2007/0180468 A1.

Once the data has been stored for a first time in the network (a process referred to as "ingestion"), the invention makes it possible to redistribute the data to other storage entities.

This redistribution may be performed either on detecting some particular event, or else progressively on receiving requests to access the data.

In the above-described implementation, data redistribution consists in updating the distribution list (by adding or deleting storage units) and in informing the units concerned so that they organize redistribution of the data. The invention also manages reception of a request to access the digital data by a receiver unit.

Thus, in a particular implementation of the invention, on receiving a request to access the digital data, the request being sent by a second sender unit (possibly the same as the first sender unit), the communication method comprises:
- a step of determining so-called "path" nodes between the second sender unit and the last node before the root of the network;
- at least for each of the path nodes, a step of counting access requests received by that node for the data;
- a step of updating the list, which step is performed as a function of the results of the counting steps;
- a step of selecting among the entities of the list a second storage entity designated to respond to the access request; and
- a step of sending information enabling the sender unit to obtain the identifier of the second storage entity.

It should be observed that such processing is meaningful only if the data is indeed still stored in a storage entity of the network, with the access request being ignored otherwise, i.e. in the event of the content no longer being stored in the network.

This particular implementation is most advantageous, since it makes it possible to mange the load on the network as a function of the access requests that are actually made for the data.

This thus produces a dynamic method of distributing digital data (i.e. storing, deploying, and delivering it), by making use of the hierarchical levels of the storage units and of other criteria, e.g. the popularity of the data. In a particular implementation of the invention, the counting step also counts the access requests received by the storage entities for obtaining the data. This particular implementation of the invention also makes it possible to take account of the real traffic to which the storage entities are subjected in order to distribute the data in the network. In a particular implementation of the invention, the updating step uses threshold values that are representative of an audience for the data in order to determine whether a storage unit needs to be added to or deleted from the list.

In the presently-described embodiment, the device includes registers in its non-volatile memory for storing the threshold values that are used for determining whether a storage unit should be added to or deleted from the list.

These threshold values may be predefined and set by the operator in order to provide an a priori sharing of load within the network.

In a particular implementation of the invention, the threshold values are variable and are updated when a predetermined event occurs.

This event may in particular be a new estimate of the audience seeking the data, an incident involving deployment or delivery, a notification to the effect that a piece of network equipment has become unavailable, an acknowledgment that a delivery or a deployment has taken place successfully, an update for the popularity of the content (updating being performed periodically or as a result of there being no request during a given length of time), or receiving an updating message sent by another node of the system. More precisely, in this implementation, updating comprises;
- a substep consisting in determining whether the result of the above-mentioned counting step is greater than the first value for each of the nodes; and if so:
  - a substep of selecting, from outside the list, at least one third storage entity referred to as a "deployment" entity suitable for storing the data, the selection step taking account at least of the results of the counting steps; and
  - a substep of triggering deployment of the data from a storage entity forming part of the list to the deployment unit by sending a deployment request to at least one of the entities.

The person skilled in the art will understand that this mechanism makes it simple to add a storage entity to the list and to organize the deployment of data to that entity. In similar manner, in a particular implementation of the invention, the updating step comprises:
- a substep consisting in determining whether the result of the counting step is less than the above-mentioned second value for each of the nodes; and if so:
  - a substep of selecting from the list at least one fourth storage entity, this step taking account of the results of the counting steps; and
  - a substep of sending to the storage unit a request to delete the data.

In another particular implementation of the invention, the threshold values are selected by the operator for a given node by estimating the popularity of a given content and by analyzing the load of the network.

It should be observed that there may be as many threshold values as there are nodes and content types, or as there are producers of those contents.

It is mentioned above that, during ingestion, the selection of the storage entity takes account of operating costs, for example a transfer cost, a storage cost, or a cost of delivering the data.

Such cost criteria may also be used in the invention to select a third storage entity for deployment.

In a particular implementation, the various steps of the data communication method are determined by computer program instructions.

Consequently, the invention also provides a computer program on a data medium, the program being suitable for being performed by a computer, the program including instructions adapted to perform steps of the data communication method as mentioned above.

The program may make use of any programming language, and be in the form of source code, object code, or code intermediate between source code and object code, such as in a partially compiled form, or in any other desirable form.

The invention also provides a computer-readable data medium that includes instructions of a computer program as mentioned above.

The data medium may be any entity or device capable of storing the program. For example, the medium may comprise storage means such as a read only memory (ROM), e.g. a compact disk (CD) ROM, or a microelectronic circuit ROM, or it may be magnetic recording means, e.g. a floppy disk or a hard disk.

Furthermore, the data medium may be a transmissible medium such as an electrical or optical signal, which may be conveyed via an electrical or optical cable, by radio, or by other means. The program of the invention may in particular be downloaded from a network of the Internet type.

Alternatively, the data medium may be an integrated circuit in which the program is incorporated, the circuit being adapted to execute or to be used in the execution of the method in question.

BRIEF DESCRIPTION OF THE DRAWINGS

Other characteristics and advantages of the present invention appear from the following description made with reference to the drawings which show an implementation having no limiting character. In the figures:

FIG. 2 is a diagram of a storage request that may be used in a particular implementation of the invention;

FIG. 3 shows the root of the FIG. 1 network, in a particular embodiment of the invention;

FIG. 3A shows a node of the FIG. 1 network, in a particular embodiment of the invention;

DETAILED DESCRIPTION OF THE INVENTION

Figure 1:
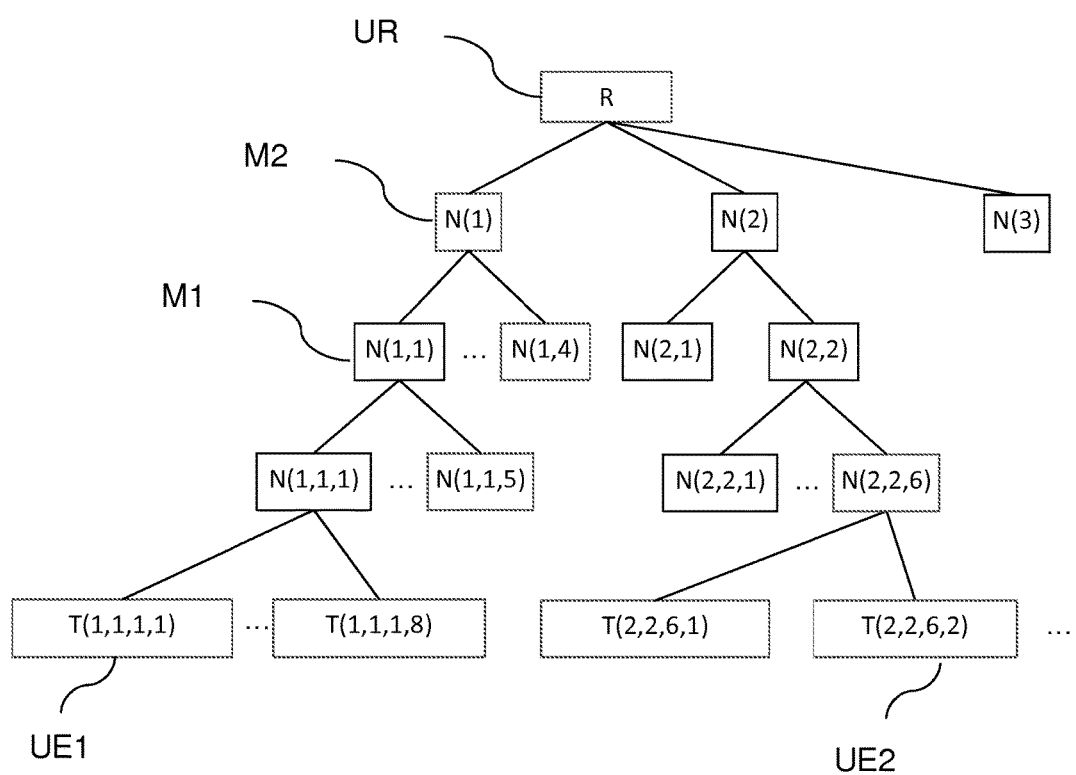
FIG. 1 shows a first telecommunications network in which the invention can be implemented.

FIG. 1 shows a first telecommunications network in which the invention may be implemented.

This telecommunications network is a hierarchical network, and more particularly a network organized in the form of a tree, the tree having a root R, various levels of nodes N, and terminal leaves T. It should be observed that the terminal leaves form an integral portion of the tree, as do the nodes.

In FIG. 1, as in FIGS. 8 and 9 described below, the following notation is used:

N(i): node of level 1;
N(i,j): node of level 2 attached to node N(i) of level 1; etc.; and
T(i,j,k,l): terminals attached to the bottom level node N(i,j,k).

In the example of FIG. 1, the receiver unit in the meaning of the invention is the root R of the network. It should be observed that in this implementation, the root (the receiver unit in the meaning of the invention) possesses complete knowledge about the hierarchical levels of the nodes of the network.

In this example, it is assumed that a sender unit UE1, constituted by the terminal T(1,1,1,1) seeks to store data in the network. In a particular implementation of the invention, this data may have been generated by the sender unit UE1, but that is not essential in the meaning of the invention.

The digital data may be constituted by a file, or by streaming data.

In accordance with the invention, when the sender unit UE1 seeks to store data in the network, it sends a storage request RQ1, which request is conveyed by the network to the receiver unit UR, namely all the way to the root R in this example.

FIG. 2 shows one implementation of such a request.

Firstly, the request has a field MEM representative of the fact that this request is a request to store data in memory.

In the implementation presently being described, this request also includes certain other fields, and in particular:

a field a including the characteristics of the content, e.g. its type and format, the type of the equipment (personal computer (PC), camera, telephone, PDA, . . . ) and the geographical location of the sender unit UE1;

a field b containing the characteristics of the type of the access network (Edge, 3D, LTE);

a field c containing broadcast characteristics of the digital data: in particular it may comprise a broadcast geographical coverage zone input by the user of the terminal UE1 and an intended audience for the data, e.g. as a function of its language or the subject of its content;

a field d including a unique identifier IDD representative of the data;

a field f including auxiliary data also known as metadata, which data may in particular contain a category of the data (sports, cultural, . . . ), an event (e.g. a TV program) used for estimating the above-mentioned audience, a title, a description, a validity of duration, the identifier of the author of the data, a broadcast right, which may possibly restrict the geographical coverage for the data, a format of the data; and a field g including characteristics of the resources needed for storing the data, e.g. in terms of availability or load.

Figure 4:
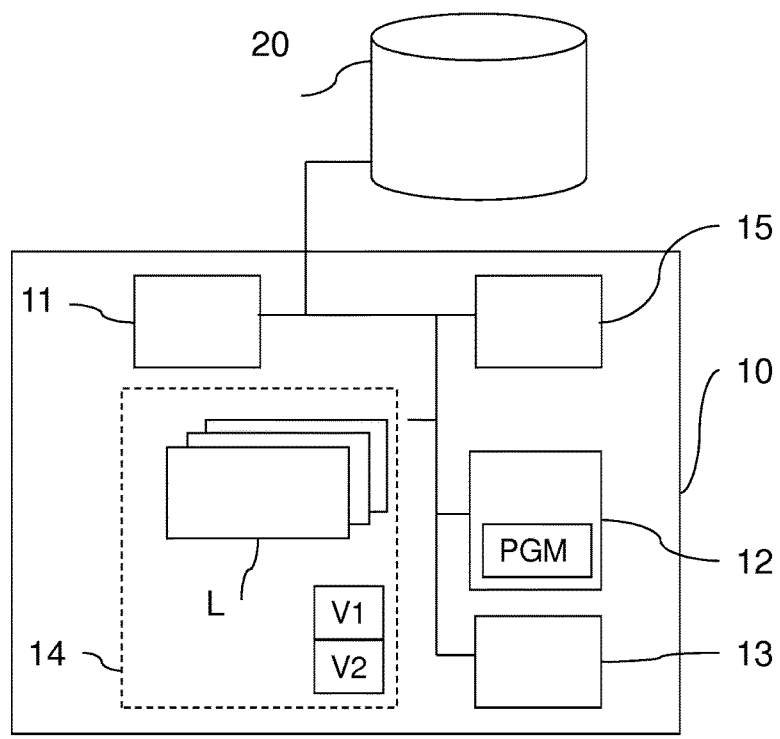
FIG. 4 shows a data communication device in a particular embodiment of the invention, incorporated in the root of FIG. 3 and in the node of FIG. 3A.

This storage request RQ1 is received by the receiver unit UR, which has hardware architecture as described below with reference to FIGS. 3, 3A, and 4.

In the presently-described embodiment, the receiver unit is a server of conventional architecture that is remarkable only in that it includes a data communication device 10 of the invention, which device has the architecture that is described in detail with reference to FIG. 4.

In the presently-described embodiment, this device has the conventional architecture of a computer. In particular, it comprises a processor 11, a random access memory (RAM) 13, a ROM 12, a rewritable non-volatile memory 14, means for accessing a database 20 containing overall information of the network, and means 15 for communicating over the network and constituted for example by a network card and corresponding software drivers.

Figure 5:
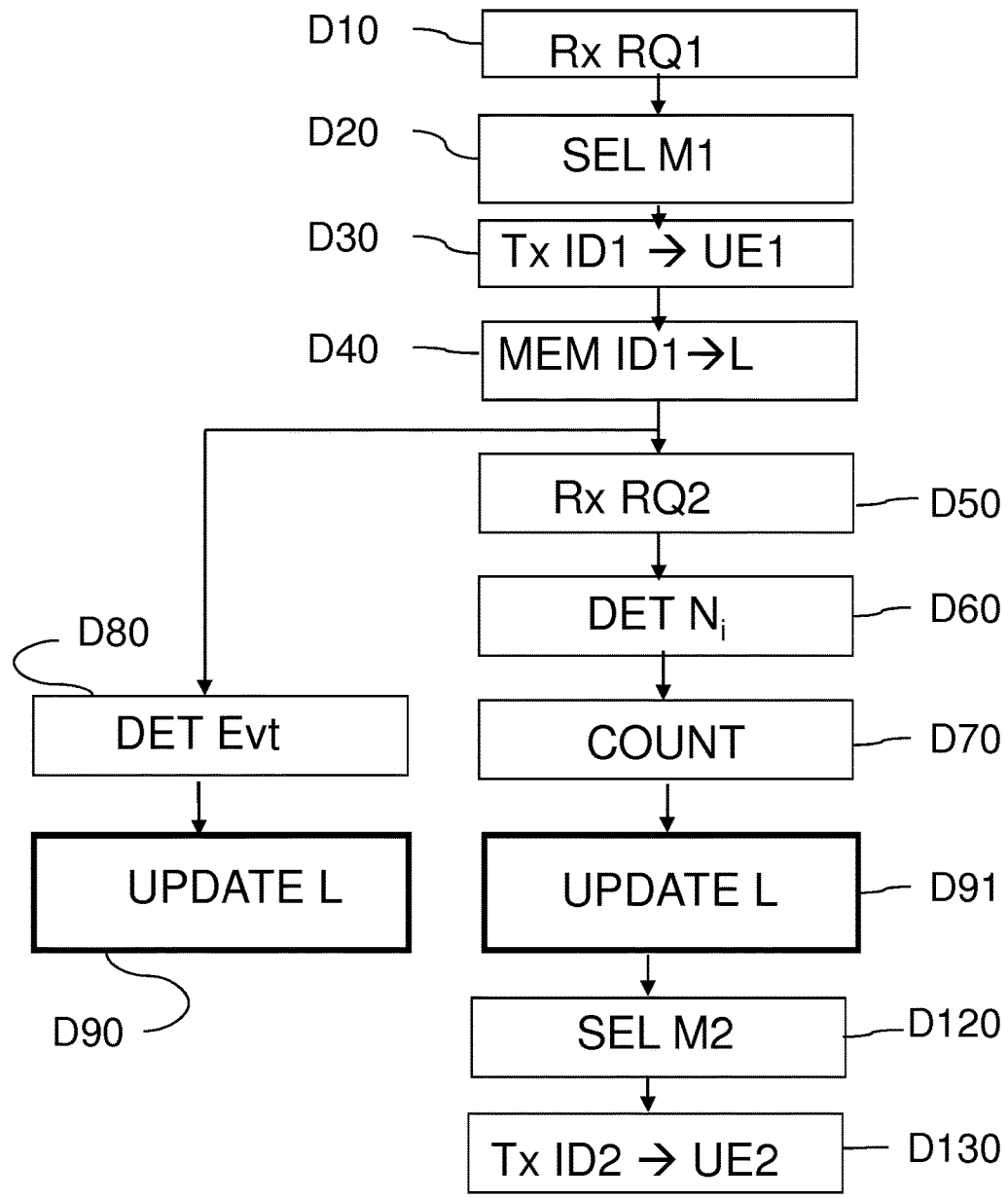
FIGS. 5 and 6 are flow charts showing the main steps of a data communication method implemented by the FIG. 4 device in a particular implementation of the invention.

The ROM 12 constitutes a storage medium in accordance with the invention and readable by the processor 11. This storage medium stores a computer program PGM in accordance with a particular implementation of the invention, and the main steps of the program are described below with reference to FIGS. 5 and 6.

In the embodiment of FIG. 1, the computer program PGM is executed by the root R of the network. It is assumed that during a step D10, the root R receives the storage request RQ1 sent by the terminal T(1,1,1,1).

In accordance with the invention, the receiver unit UR constituted by the root R acts during a general step D20 to select a storage entity M1 (first entity in the meaning of the invention) suitable for storing the data announced by the request.

In accordance with the invention, this selection is made while taking account of the hierarchical level of the storage entity M1 in the network, this hierarchical level being obtained from minimum characteristics (in terms of storage) of the entity M1 (contained in the field g) and digital data broadcast characteristics contained in the field c.

In a variant, the selection of the hierarchical level also takes account of the geographical location or the network of the sender unit.

In another implementation, selection of the hierarchical level also takes account of the access type characteristics of the network.

The step D20 of selecting the storage entity M1 is followed by a step D30 during which the receiver unit UR sends to the sender unit UE1 the identifier ID1 of the storage entity M1.

In the presently-described implementation, the communication method of the invention has a step D40 of storing the identifier ID1 of the storage entity M1 in a list L.

In the presently-described implementation, this list L is stored in a rewritable non-volatile memory 14 of the device 10 of the invention.

This list L is associated with a unique identifier IDD of the data to which the storage request RQ1 relates.

In the presently-described implementation, this unique identifier IDD is contained in the field d as described above with reference to FIG. 2.

In a variant, this unique identifier IDD may be obtained from other information contained in the request.

In general, it may be observed that the function of the list L is to store the storage entities that, at an instant t, are storing at least a portion of the data to which the request RQ1 relates.

As described below, it is entirely possible for a plurality of storage entities to contain this data.

Above-described steps D10 to D40 constitute a first stage of the method of the invention that may be referred to as a "data-ingestion" stage, in other words a stage in which data is first stored in the network. There follows a description of how the list L can be updated.

In the presently-described implementation, the list may be updated either when an event is detected (step D80), or else when a request to access data is received by the receiver unit UR (step D50).

More precisely, the following events may be used for updating the list L, whenever they are detected (step D80):
  a modification to the validity of the data, e.g. the end of a validity period;
  a modification to the audience in the network;
  a modification to the geographical zone in which the data is to be delivered; and
  receiving an external command issued by a user or by a monitoring entity of the network, e.g. a monitor unit.

Figure 6:
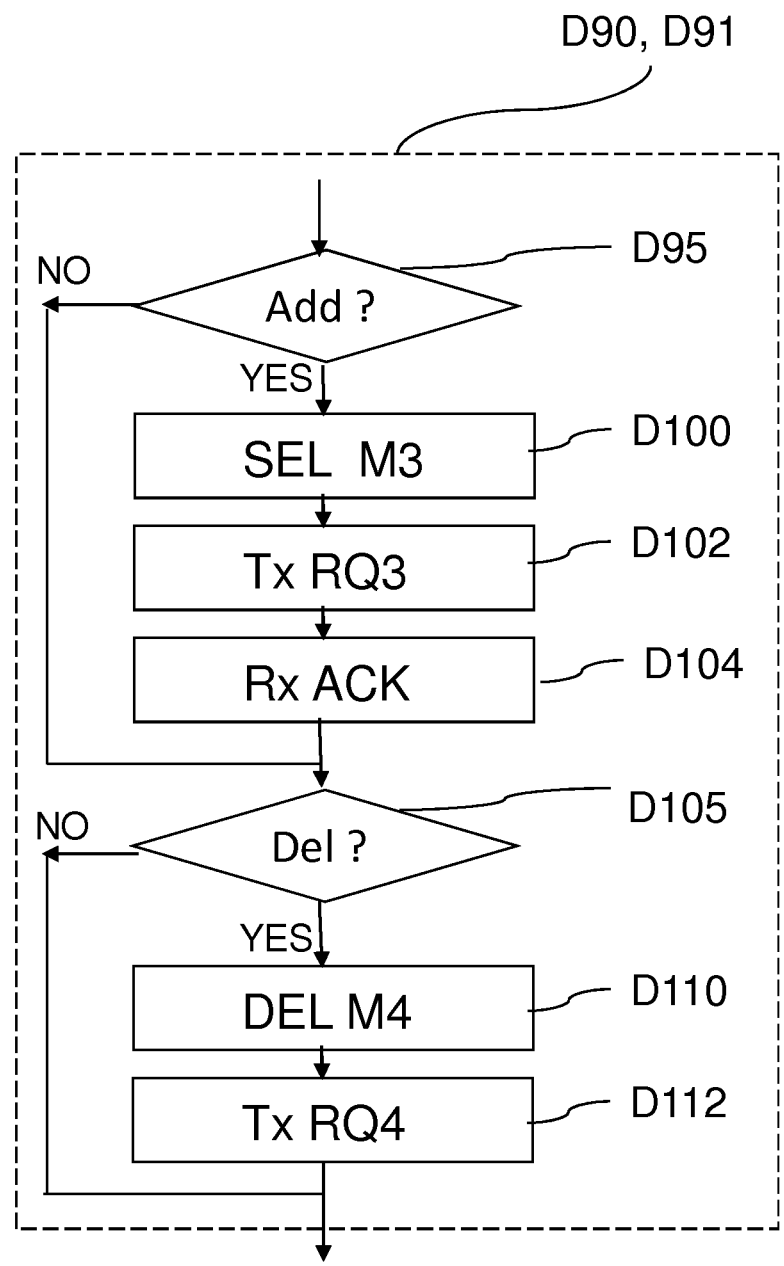

This updating step D90 is described below in greater detail with reference to FIG. 6.

This updating may consist in:
  doing nothing;
  adding one or more storage entities M3 (a deployment unit in the meaning of the invention) to the list; and/or
  deleting one or more storage entities M4 that are present in the list.

In the presently-described example, the general updating step D90 has a first test D95 during which it is determined whether a storage unit M3 is to be added to the list.

A criterion for taking such a decision may be to determine that the local or global audience is likely to increase greatly.

When this happens, the general updating step D90 includes a substep D100 in which one or more deployment units M3 are selected, e.g. by performing a mechanism similar to that used previously for selecting the storage entity M1. This mechanism makes it possible to deploy all or some of the data stored in at least one storage unit of the list L to the deployment unit M3.

For this purpose, during a step D102, the receiver unit R sends a so-called "deployment" request R3 to the source unit having the data that is to be transferred, or to the deployment unit M3 that has been selected to receive the data.

This step D102 may be referred to as triggering deployment.

In the presently-described implementation, the receiver unit UR sends an acknowledgment of receipt (step 104).

As specified above, updating the list may also consist in deleting at least one storage unit M4 from the list L (step D110). This deletion may be determined during a test D105, in particular when the assumed audience for the digital data is dropping.

In the presently-described implementation, during a step D112, the receiver unit R sends a request RQ4 to the storage unit deleted from the list so that it can release storage space, in particular. The above-described updating (general step D90) is performed when above-described step D80 describes an event.

Consideration is given below to the particular situation in which, during a step D50, the receiver unit R receives a request RQ2 to access the digital data.

Figure 7:
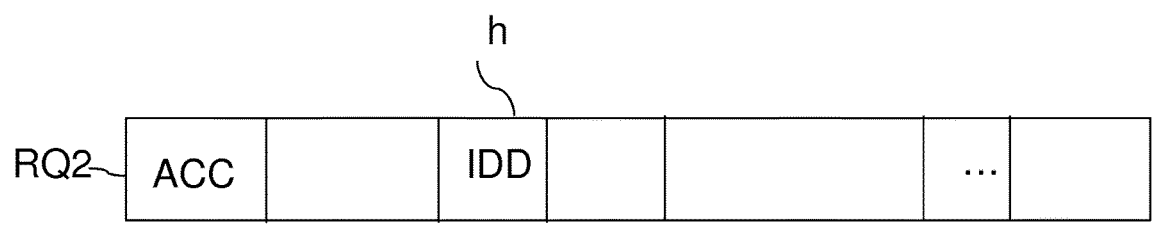
FIG. 7 is a diagram of an access request that may be used in a particular implementation of the invention.

Such a request is shown diagrammatically in FIG. 7.

It comprises in particular a field ACC representative of the fact that the request is a request for access.

The request also includes information enabling the receiver unit to identify the data concerned. In the presently-described implementation, it has a field h including an identifier IDD identical to that in the field d of the request RQ1. In general, in the presently-described example, in order to determine how the list L is to be updated, the method of the invention proposes measuring the real audience for the data and the cost of the previous accesses made to that data, as seen from the point of view of the operator (transit cost, storage cost, delivery cost). More precisely, in the presently-described example, the receiver unit UR acts during a step D60 to determine so-called "path" nodes that are situated in the network between the unit sending the access request RQ2 and the level 1 node situated on the path between the sender unit and the root unit R.

It should be observed that the unit sending the access request RQ2, written UE2 in FIG. 1, is not necessarily the same unit as the unit UE1 that sends the storage request in step D10.

In the presently-described example, the sender unit UE2 is the terminal T(2,2,6,2).

Consequently, using the above definition, the so-called "path" nodes are the nodes N(2,2,6), N(2,2), and N(2).

Thereafter, during a step D70, the receiver unit counts for each of the path nodes the number of access requests that those nodes have received for the data in question.

In a particular implementation of the invention, during this step D70, a count is also made of the transfer requests received by the storage entities of the network and sent by a terminal in order to obtain the digital data.

In any event, the result of the counting step relating to path nodes and possibly also to storage entities is used for updating the list L during a step D91.

This step D91 is strictly similar to above-described step D90 and is therefore not described in detail herein.

It should merely be observed that updating may consist in doing nothing, in adding entities to the list L, or in deleting them therefrom.

When an access request RQ2 has been received (step D50), after updating the list L (step D91), the receiver unit R selects a storage entity M2 that it designates to respond to the access request from the sender unit UE2 during a step D120.

The criteria used for selecting the second storage entity M2 do not form part of the invention.

In particular, it is possible to use the criteria described in the document published under the number WO 2009/056743.

The step D120 of selecting the second storage entity N2 is followed by a step D130 during which the receiver unit UR sends information to the sender unit UE2 so that it can obtain the identifier of said storage unit M2.

In the simplest implementation, this step consists merely in sending the identifier ID2 of the storage unit M2 to the sender unit UE2.

In the example described above with reference to FIGS. 1 to 7, the decisions concerning which storage units are selected during ingestion and concerning which deployment entities are selected are performed by the root R of the network.

It is important to observe that, in accordance with the invention, selection of the second entity (step D120) takes place after the list has been updated (step D91).

Figure 8:
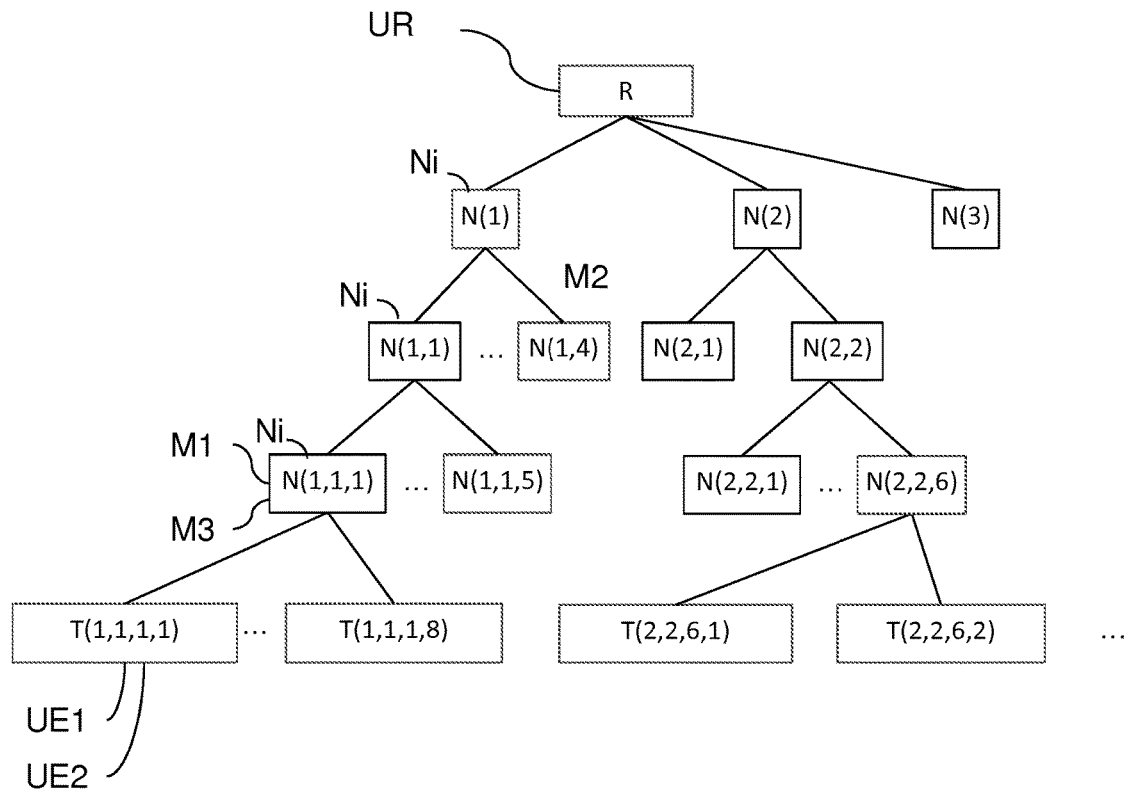
FIG. 8 shows the FIG. 1 network in a state that can be obtained by means of the invention.

FIG. 8 serves to illustrate the advantage of the deployment mechanism.

This figure shows that the first storage entity M1 selected during ingestion was deleted from the list L during a step D110 and then redesignated as a deployment unit M3 during the step D100.

It is important to understand clearly that the invention can be implemented by a network node and need not necessarily be implemented by the root R.

Figure 9:
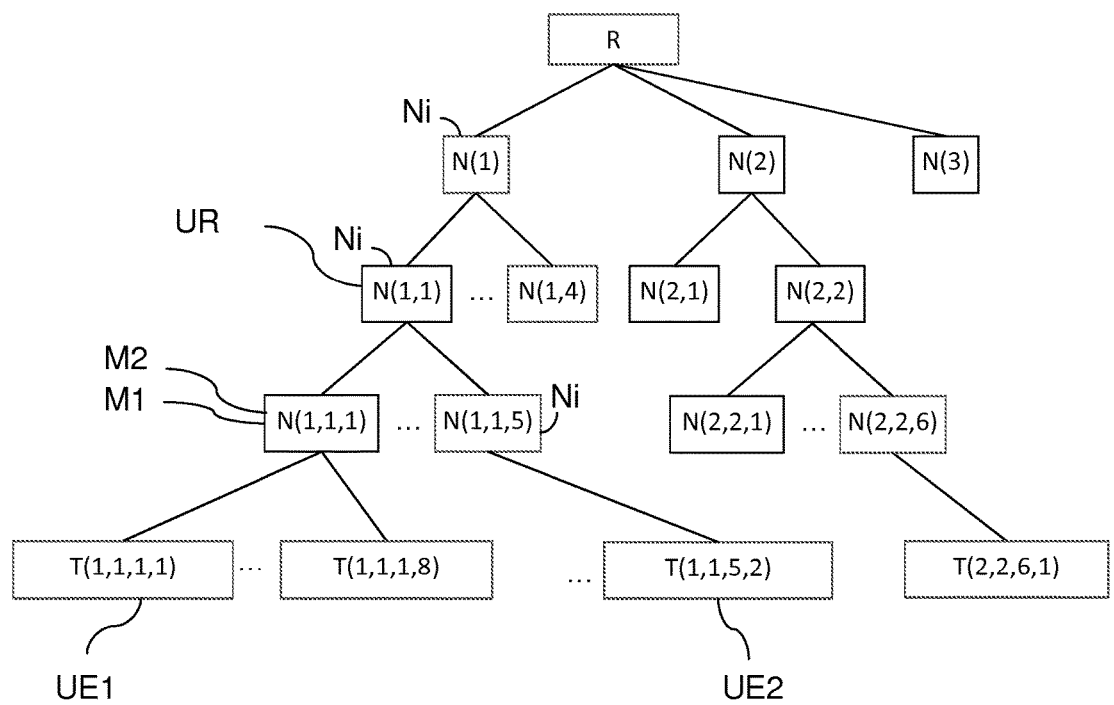
FIG. 9 shows a second telecommunications network in which the invention can be implemented.

Consequently, FIG. 9 shows a second network in which the invention can be implemented.

It should be observed that in this example, the receiver unit is constituted by a node of the network, and more precisely by a level 2 node N(1,1). It can be observed that in this implementation, the node N(1,1), i.e. a receiver unit in the meaning of the invention, possesses partial knowledge about the hierarchical levels of the nodes of the network.

In this example, it should also be observed that the storage unit M1 identified during the ingestion step (step D20), i.e. the first unit to store the data, is also the unit M2 as identified in step D120 that is to deliver the data to the terminal UE2.

In the particular situation in which an audience criterion is used for determining whether a storage unit is to be added to the list L or deleted therefrom, it is possible in one implementation to make use of two threshold values V1 and V2 for this purpose.

More precisely, when the number of access or transfer requests counted becomes greater than the first value V1, it is decided to add an element to the list, and when the count result is less than the value V2, it is decided to delete an element from the list.

These values V1 and V2 may be initialized to predefined values and they may advantageously be updated during the step D90 when events are detected, e.g. events tending to lower or on the contrary to increase the estimated audience for the data.

Figure 10:
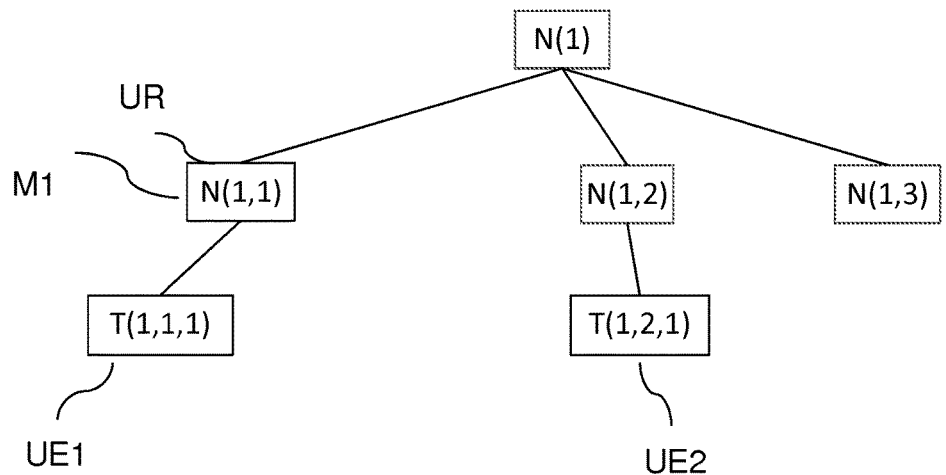
FIG. 10 shows a third telecommunications network in which the invention can be implemented.

With reference to FIG. 10, there follows a description of an example of how a threshold value V1 is calculated and used, such as threshold value being used to select a storage unit M3 for adding to the list L, as described above with reference to the step D100.

In this example, the first sender unit UE1 is the terminal T(1,1,1), the receiver unit UR is the node N(1,1), and the second sender unit UE2 is the terminal T(1,2,1).

In this example, the following notation is used:
P(C,N1,N2): the number of requests to access a content C as received by the node N1 relating to the zone covered by the node N2;
CT(N,M): the cost of transporting the content C from node N to node M;
CS(N): the cost of storing the content C on node N; and
CL(N): the cost of delivering the content C by the node N.

It is assumed that the terminal T(1,1,1) sends a storage request RQ1 for storing the content C to the receiver unit N(1,1).

The main steps of the communication method of the invention are as follows:
step D10: the receiver unit N(1,1) receiving the storage request sent by the terminal T(1,1,1);
step D20: selecting the first storage unit; in this example, the node N(1,1) is selected, since the content C has a geographical range limited to the zone covered by that node;
step D30: the receiver unit N(1,1) informs the terminal T(1,1,1) of the coordinates of the storage unit N(1,1) on which the content C is to be stored;
step D40: the node N(1,1) updates the list L of nodes from which the content C is available;
step D50: the terminal T(1,2,1) sends an access request RQ2 to the receiver unit N(1,1) for the content C;
step D60: the receiver unit N(1,1) determines the path nodes between the terminal T(1,2,1) and the storage unit N(1,1), i.e. the nodes N(1,2) and N(1);
step D70: counting access requests for the path nodes N(1,2) and N(1), and for the storage unit N(1,1); and
step D91: updating the threshold value V1 as follows:

In this example, the threshold V1 is the smaller of the threshold values SN(1,2) and SN(1) as calculated for the nodes N(2,1) and N(1), as follows:

$$SN(1, 2) = [CT(N(1, 1), N(1, 2)) + CS(N(1, 2))] / [CT(N(1, 2), N(1, 2) + CL(N(1, 1)) - CL(N(1, 2))]$$

-continued $$SN(1) = [CT(N(1, 1), N(1)) + CS(N(1))] / [CT(N(1, 2), N(1) + CL(N(1, 1)) - CL(N(1))].$$

step D100 of selecting M3 if:

$$P(C, N(1,1), N(1,2)) > V1$$

with M3 being selected to be equal to:
N(1,2) if V1 is equal to SN(1,2); and
N(1) if V1 is equal to SN(1).

The invention claimed is:

1. A computer-implemented method of communicating digital data that is performed by a receiver entity in a hierarchical telecommunications network, said receiver entity having knowledge of hierarchical levels of nodes of the network, the method comprising, on reception of a request to store data from a first sender unit:
selecting at least one first storage entity for storing the data, based at least on a hierarchical level of said at least one first storage entity in the network, wherein said hierarchical level satisfies at least one of minimum storage characteristics for storing the data and broadcast characteristics of the data, said at least one of minimum storage characteristics and broadcast characteristics indicated in the request; and
sending information to said first sender unit, to enable said first sender unit to obtain an identifier of said at least one first storage entity.

2. The method of claim 1, wherein said selecting is further based on a location of said first sender unit.

3. The method of claim 1, further comprising storing said identifier in a list associated with a unique identifier for said data.

4. The method of claim 3, further comprising updating said list.

5. The method of claim 4, wherein said updating is performed on detecting an event.

6. The method of claim 4, wherein updating the list comprises using threshold values representative of an audience for said data in order to determine whether to add or delete a storage entity.

7. The method of claim 6, further comprising updating at least one of said threshold values following said determination.

8. The method of claim 3, wherein, on receiving a request to access digital data from a second sender unit, said digital data stored at least in one storage entity, the method further comprises:
determining path nodes between said second sender unit and a last node before the root of said network;
for each of said path nodes, counting access requests received by the path node for said digital data;
updating the list as a function of the result of the counting;
selecting from said list a second storage entity designated to respond to said access request; and
sending information enabling said second sender unit to obtain an identifier of said second storage entity.

9. The method of claim 8, wherein said counting further comprises counting access requests received by storage entities of the network for obtaining said digital data.

10. The method of claim 8, wherein updating the list comprises:
determining whether the result of said counting is greater than a first value for a storage entity in the list; and if the result is greater than the first value:
selecting from outside of said list at least one third storage entity as a deployment entity for storing data of the storage entity; and
triggering deployment of said data of the storage entity from the storage entity to said deployment entity by sending a deployment request to at least one of the storage entity and the deployment entity.

11. The method of claim 8, wherein updating the list comprises:
determining whether the result of said counting is less than a second value for a storage entity in the list; and if the result is greater than the second value:
deleting from said list said storage entity; and
sending to said storage entity a request to delete said data.

12. The method of claim 3, wherein said identifier is obtained from fields of said request to store data.

13. The method of claim 1, wherein selecting the at least one first storage entity is based on at least one element selected from one of the following:
the cost of transporting data over links of the network;
the cost of storing said data by said at least one first storage entity; and
locations of terminals to which said data is to be sent.

14. The method of claim 1, wherein the hierarchical level further accounts for a geographical location of the sender unit.

15. A digital data communication device suitable for being incorporated in a receiver entity in a hierarchical telecommunications network, said receiver entity having knowledge of hierarchical levels of nodes of the network, the device comprising:
a receiver configured to receive a request to store data from a first sender unit;
a selector configured to select a first data storage entity for storing the data based at least on a hierarchical level of said at least one storage entity in the network, wherein said hierarchical level satisfies at least one of minimum storage characteristics for storing the data and broadcast characteristics of the data, said at least one of minimum storage characteristics and broadcast characteristics indicated in the request; and
a sender configured to send information to said first sender unit to enable said first sender unit to obtain an identifier of said at least one first data storage entity.

16. The digital data communication device according to claim 15, wherein the digital data communication device is implemented in a root of a hierarchical telecommunications network.

17. The digital data communication device according to claim 15, wherein the digital data communication device is implemented in a node for use in a hierarchical telecommunications network, the node comprising a storage for storing data received by said digital data communication device.

18. A non-transitory computer-readable storage medium having stored thereon instructions that when executed by a processor perform a data communication method, wherein said data communication method is implemented by a receiver entity in a hierarchical telecommunications network, said receiver entity having knowledge of hierarchical levels of nodes of the network and wherein, on reception of a request to store data from a first sender unit, said data communication method comprises:
selecting at least one first storage entity for storing the data based, at least, on a hierarchical level of said at least one first storage entity in said hierarchical telecommunications network, wherein said hierarchical level satisfies at least one of minimum storage characteristics for storing the data and broadcast characteristics of the data, said at least one of minimum storage characteristics and broadcast characteristics indicated in the request; and sending information to said first sender unit to enable said first sender unit to obtain an identifier of said at least one first storage entity.

\* \* \* \* \*